(12) United States Patent
Shamis et al.

(10) Patent No.: US 10,694,449 B2
(45) Date of Patent: *Jun. 23, 2020

(54) METHOD AND APPARATUS FOR AUTOMATICALLY DETECTING AND CONNECTING TO WI-FI NETWORKS

(71) Applicant: Apple Inc., Cupertino, CA (US)

(72) Inventors: Artiom Shamis, Los Gatos, CA (US); Kapil Chhabra, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,474

(22) Filed: Jul. 15, 2019

(65) Prior Publication Data

US 2020/0015150 A1 Jan. 9, 2020

Related U.S. Application Data

(63) Continuation of application No. 15/983,737, filed on May 18, 2018, now Pat. No. 10,356,696, which is a continuation of application No. 15/400,622, filed on Jan. 6, 2017, now Pat. No. 9,980,208, which is a
(Continued)

(51) Int. Cl.
| | | |
|---|---|---|
| *H04W 48/12* | (2009.01) | |
| *H04W 48/16* | (2009.01) | |
| *H04W 40/24* | (2009.01) | |
| *H04W 4/80* | (2018.01) | |
| *H04W 48/18* | (2009.01) | |
| *H04W 4/02* | (2018.01) | |
| *H04W 84/12* | (2009.01) | |

(Continued)

(52) U.S. Cl.
CPC ............ *H04W 48/12* (2013.01); *H04W 4/02* (2013.01); *H04W 4/80* (2018.02); *H04W 40/244* (2013.01); *H04W 48/16* (2013.01); *H04W 48/18* (2013.01); *H04W 8/12* (2013.01); *H04W 84/12* (2013.01); *H04W 88/06* (2013.01); *Y02D 70/00* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/22* (2018.01)

(58) Field of Classification Search
CPC ............................... H04W 48/12; H04W 4/80
See application file for complete search history.

(56) References Cited

U.S. PATENT DOCUMENTS

| | | |
|---|---|---|
| 7,646,745 B2 | 1/2010 | Caldwell et al. |
| 9,544,838 B2 | 1/2017 | Sitamis et al. |
| 9,980,208 B2 | 5/2018 | Shamis et al. |

(Continued)

*Primary Examiner* — Angel T Brockman
(74) *Attorney, Agent, or Firm* — Sterne, Kessler, Goldstein & Fox P.L.L.C.

(57) ABSTRACT

An apparatus and methods are provided for automatically detecting and connecting to a Wi-Fi network. In these methods, a wireless device listens for beacons that are sent using a low-power wireless protocol. Once the wireless device detects a first beacon at a first location, the wireless device extracts a first beacon region identifier from the beacon and correlates the first beacon region identifier with a first Wi-Fi network that is located at the first location. Next, the wireless device retrieves a first set of credentials for connecting to the first Wi-Fi network. Once the first set of credentials is retrieved, the wireless device uses the first set of credentials to connect to the first Wi-Fi network.

20 Claims, 9 Drawing Sheets

Related U.S. Application Data continuation of application No. 14/449,980, filed on Aug. 1, 2014, now Pat. No. 9,544,838.

(51) Int. Cl.
  *H04W 8/12* (2009.01)
  *H04W 88/06* (2009.01)

(56) References Cited

U.S. PATENT DOCUMENTS

| | | |
|---|---|---|
| 10,356,696 B2 | 7/2019 | Shamis et al. |
| 2002/0067832 A1 | 6/2002 | Jabion |
| 2008/0287142 A1 | 11/2008 | Keighran |
| 2009/0323608 A1 | 12/2009 | Adachi et al. |
| 2012/0170521 A1 | 7/2012 | Vogedes et al. |
| 2013/0324196 A1 | 12/2013 | Wang et al. |
| 2014/0206346 A1 | 7/2014 | Kiulckonen et al. |
| 2016/0381705 A1 | 12/2016 | Jeong et al. |
| 2017/0215128 A1 | 7/2017 | Shamis et al. |
| 2018/0270737 A1* | 9/2018 | Shamis ................. H04W 48/16 |

* cited by examiner

METHOD AND APPARATUS FOR AUTOMATICALLY DETECTING AND CONNECTING TO WI-FI NETWORKS

CROSS-REFERENCE TO RELATED APPLICATION

This application is a continuation of U.S. patent application Ser. No. 15/983,737, filed May 18, 2018, now allowed, which is a continuation U.S. patent application Ser. No. 15/400,622, filed Jan. 6, 2017, now U.S. Pat. No. 9,980,208, which is a continuation of U.S. patent application Ser. No. 14/449,980, filed Aug. 1, 2014, now U.S. Pat. No. 9,544,838, the contents of which are hereby incorporated by reference in their entireties.

BACKGROUND

Field

The disclosed embodiments generally relate to techniques for connecting to Wi-Fi networks.

Related Art

While public Wi-Fi networks are increasingly available to provide Internet connectivity, a wireless device user often fails to take advantage of these Wi-Fi networks because (1) the user is unaware of a Wi-Fi network's existence, (2) the user wants to avoid using her device's Wi-Fi interface in order to save power, or most importantly (3) the user finds it too cumbersome to connect to a Wi-Fi network.

The steps involved in connecting to a Wi-Fi network include: manually waking the device's Wi-Fi interface, waiting for the Wi-Fi interface to come online, manually selecting the right Wi-Fi network to connect to, encountering a landing page that requests Wi-Fi credentials to connect to the Wi-Fi network, manually typing in the Wi-Fi credentials, and so forth. Faced with this tedious process, a user may opt instead to rely on a slower and more expensive source of Internet connectivity, such as the wireless device's cellular connection, or simply go without any connection at all. Thus, what is needed is a system that enables a wireless device to detect and connect to Wi-Fi networks with minimal user intervention SUMMARY The disclosed embodiments relate to a technique that enables a wireless device to automatically detect and connect to a Wi-Fi network. During, a wireless device listens for beacons that are sent using a low-power wireless protocol. Once the wireless device detects a first beacon at a first location, the wireless device extracts a first beacon region identifier from the beacon and correlates the first beacon region identifier with a first Wi-Fi network that is located at the first location. Next, the wireless device retrieves, from an internal cache, a first set of credentials for connecting to the first Wi-Fi network. Once the first set of credentials is retrieved, the wireless device uses the first set of credentials to connect to the first Wi-Fi network.

In some embodiments, before the wireless device listens for the beacons, the wireless device performs the following steps to initialize its cache. First, the device determines that it has been transported into a first geographic region. In response to this determination, the device contacts a remote server and downloads from the remote server information regarding one or more Wi-Fi networks located within the first geographic region. The remote server then passes this information to the device in the form of database entries, wherein each entry is associated with a Wi-Fi network in the first geographic region, and comprises a beacon region identifier associated with the Wi-Fi network and a set of credentials for connecting to the Wi-Fi network. Finally, the device caches the information.

BRIEF DESCRIPTION OF THE FIGURES

In the figures, like reference numerals refer to the same figure elements.

DETAILED DESCRIPTION

Figure 1:
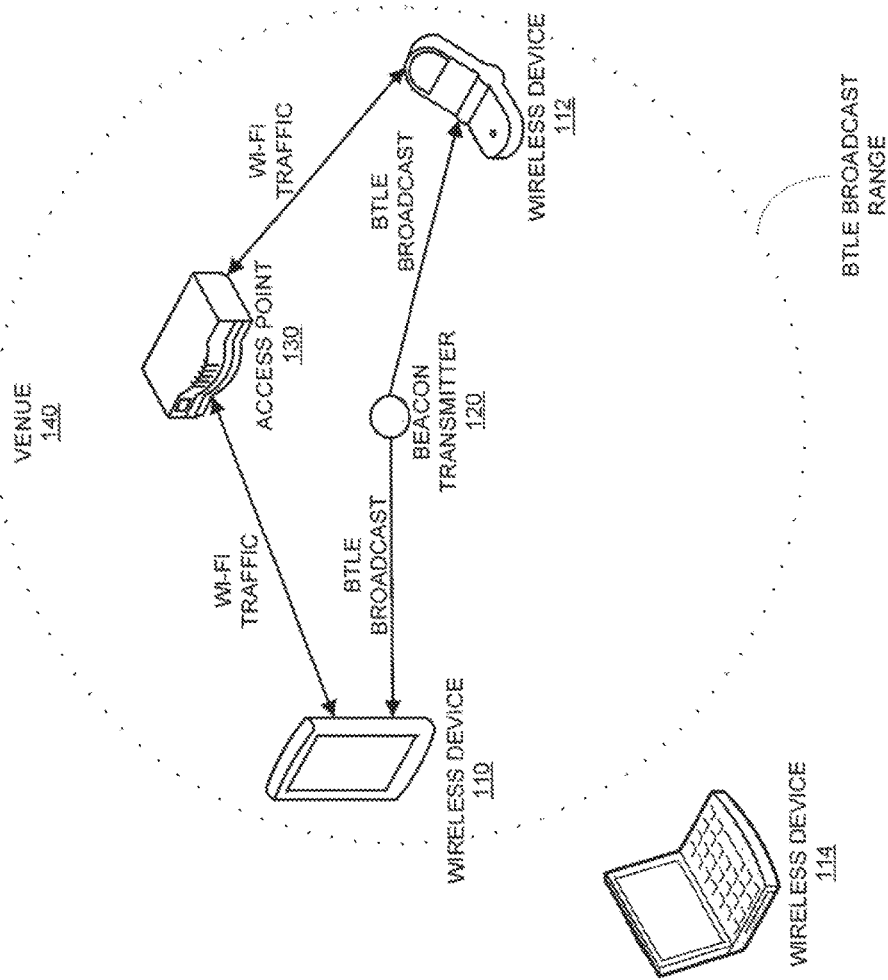
FIG. 1 illustrates a local communication environment, wherein a wireless device interacts with a beacon transmitter and joins a Wi-Fi network provided at a venue.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Proprietors of commercial venues often provide public Wi-Fi networks to entice customers to their venues. One example of a venue is a privately owned coffee shop that uses a single wireless access point to implement a small Wi-Fi network that spans the shop's seating area. A more complex venue would be a department store chain that maintains multiple stores in different locations. Here, the venue would need to have each location maintain a separate Wi-Fi network.

A geographical region of any substantial size would have tens or hundreds of venues, each offering its own set of Wi-Fi networks for the local population to connect their devices to. Because each Wi-Fi network is likely protected by different Wi-Fi credentials, however, most users would likely only use a tiny fraction of the Wi-Fi networks offered to them, because as described in the introduction, it is simply too inconvenient to set up a wireless connection each time a Wi-Fi network is available. Furthermore, users often keep their wireless devices' Wi-Fi interfaces in a dormant state to save battery power, thereby making it even less likely that the users would connect to an available Wi-Fi network.

Some embodiments may remedy the underutilization of Wi-Fi networks by enabling wireless devices to automatically detect and connect to a Wi-Fi network. The embodiments also provide a wireless device that contains (1) a cellular network interface capable of communicating with a remote server across the Internet, (2) a Wi-Fi interface capable of connecting to a Wi-Fi network, and (3) a low-power wireless interface capable of detecting beacons that are broadcast using a low-power wireless protocol. The embodiments also provide low-cost battery-operated beacon transmitters that are capable of periodically broadcasting beacons that contain a unique beacon region identifier using the same low-power wireless protocol. The embodiments also provide a remote server that is capable of communicating with the wireless device and storing large datasets that map beacon region identifiers to Wi-Fi credentials.

The embodiments then prescribe the placement of beacon transmitters throughout venue locations so that whenever a wireless device is within range of a venue's Wi-Fi network, the mobile device will also be in range of a beacon broadcast. The embodiments then store within the remote server Wi-Fi credentials and an associated beacon region identifier for each Wi-Fi network provided by one of the venues. For example, the department store chain may submit Wi-Fi credentials and beacon region identifiers for each Wi-Fi network provided by the venue to the remote server via a secure transaction over the Internet.

Now, when a wireless device travels within range of a Wi-Fi network, the wireless device's low-power wireless interface detects a beacon broadcast by a beacon transmitter that was positioned to advertise the Wi-Fi network. In response to this detection, the wireless device extracts a beacon region identifier from the beacon, sends the beacon region identifier to the remote server, and receives the associated Wi-Fi credentials in response. The wireless device is then able to connect to the Wi-Fi network using the Wi-Fi credentials.

Thus, one advantage provided by the embodiments is enabling wireless devices to connect to one or more Wi-Fi networks without requiring the user to perform any action. Here, the provisioning of Wi-Fi credentials is accomplished without any user configuration, manual typing, or interaction with a venue location's staff. Another advantage provided by the embodiments is enabling the wireless device to connect to the Wi-Fi networks of all venues that participate in the system, thereby making it possible for the wireless device to seamlessly connect from one Wi-Fi network to another as the wireless device travels throughout the geographic region. In some embodiments, rather than retrieving Wi-Fi credentials from the remote server every time a Wi-Fi network is encountered, the wireless device may cache Wi-Fi credentials and beacon region identifiers for all Wi-Fi networks within the geographic region. These embodiments allow the wireless device to suspend its cellular network interface. Furthermore, because the wireless device relies only on its low-power wireless interface to detect the presence of a Wi-Fi network, to conserve battery power, some embodiments may have the wireless device suspend its cellular network interface, its Wi-Fi interface, and other parts of itself, leaving only its low-power wireless interface active. Here, once the low-power wireless interface infers the presence of a Wi-Fi network via the detection of a beacon broadcast, the wireless device may wake up portions of itself to take advantage of the Wi-Fi network.

An apparatus and methods are also provided for forming and advertising a Wi-Fi network. In these methods, a first wireless device receives an input from a user of the first wireless device. In response to receiving this input, the first wireless device broadcasts a beacon that contains a beacon region identifier that is associated with a Wi-Fi network that the first wireless device provides. This broadcast enables a second wireless device to detect the beacon broadcast, retrieve a set of credentials for connecting to the Wi-Fi network provided by the first wireless device, and connect to the Wi-Fi network.

In some embodiments, prior to receiving the user's input, the first wireless device performs the following steps while communicating with the second wireless device during an initial configuration phase. First, the first wireless device generates the set of credentials that is used to connect to the first wireless device's Wi-Fi network. Next, the first wireless device sends the set of credentials and the beacon region identifier to the second wireless device for the second wireless device to store.

Communication Environment

Figure 2:
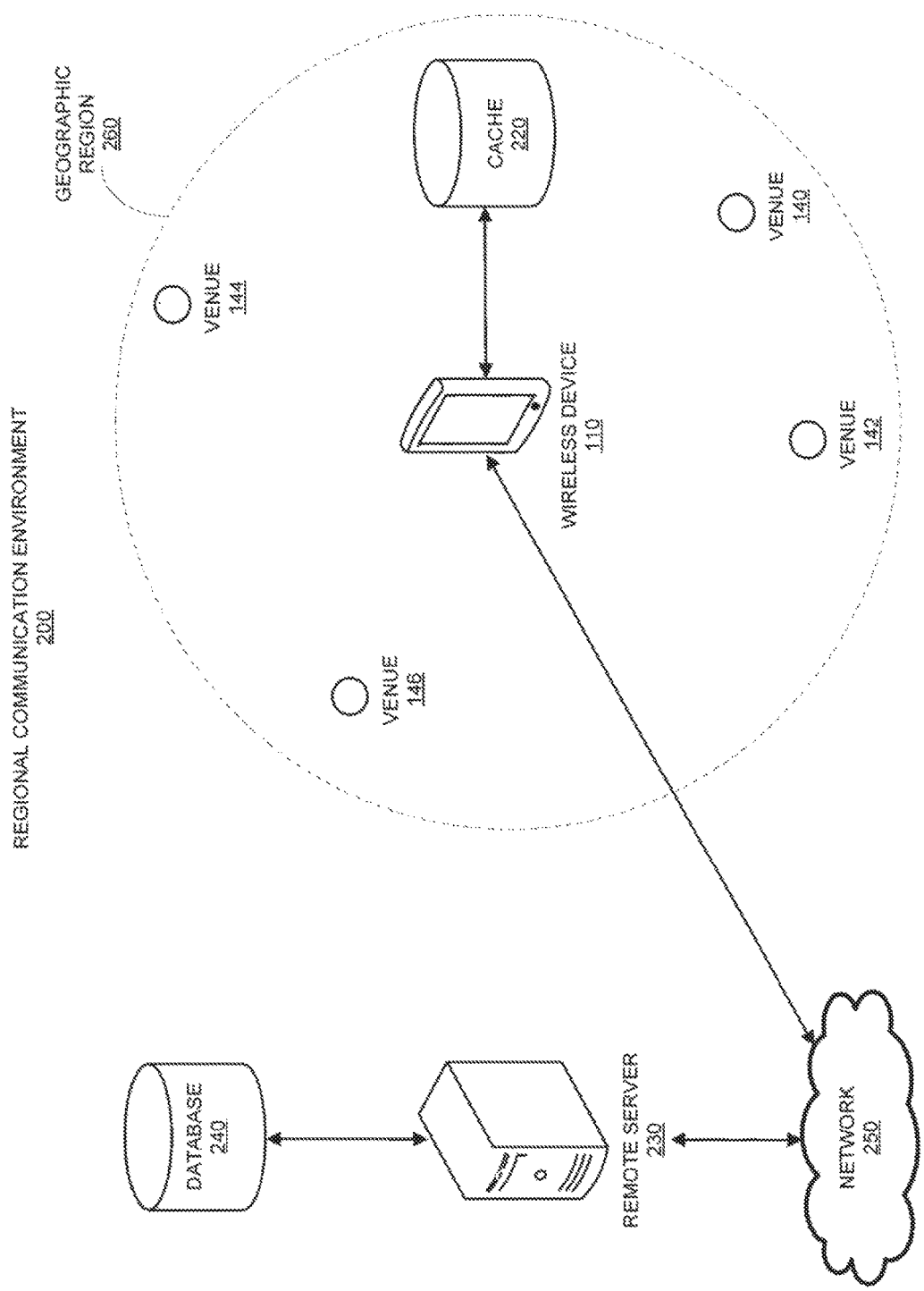
FIG. 2 illustrates a regional communication environment, wherein a wireless device communicates with a remote server to cache information regarding one or more venues in a geographic region.
Figure 3:
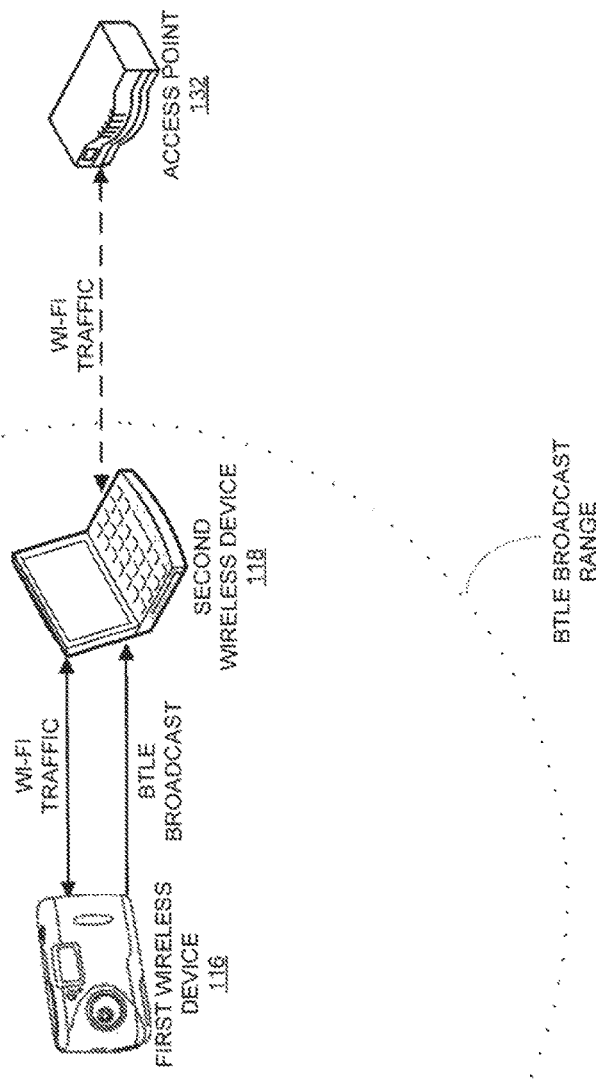
FIG. 3 illustrates a local communication environment, wherein a second wireless device temporarily connects to a first wireless device to perform one or more transactions.

FIGS. 1-3 illustrate communication environments in accordance with the provided apparatus and methods. Communication environments 100, 200, and 300 include a number of computer systems, which can include any type of computer system based on a microprocessor, a mainframe computer, a digital signal processor, a digital signal transmitter, a portable computing device, a personal organizer, a personal communications device, a device controller, or a computational engine within an appliance.

Referring to FIG. 1, local communication environment 100 includes wireless devices 110-114, beacon transmitter 120, access point 130, and venue 140. Referring to FIG. 2, regional communication environment 200 includes wireless device 110, venues 140-146, cache 220, remote server 230, database 240, network 250, and geographic region 260.

Referring to FIG. 3, local communication environment 300 includes first wireless device 116, second wireless device 118, and access point 132.

Wireless devices 110-118 may include any type of computing device that is capable of connecting to a wired network using a wireless communications protocol such as Wi-Fi. For example, wireless devices 110-118 may include a smartphone, a cell phone, a personal digital assistant (PDA), a laptop, a camera, or a tablet computer.

Beacon transmitter 120 may include any device that includes circuitry capable of broadcasting a beacon frame using a low-power wireless communication protocol such as Bluetooth, Bluetooth Low Energy (BTLE), Near Field Communications (NFC), or Zigbee. For example, beacon transmitter 120 may include a small, low-cost, battery-operated beacon device such as an iBeacon device, a smartphone, a cell phone, a PDA, a laptop, a camera, a tablet computer, a wireless router, a wireless access point, or a wireless base station.

Access points 130-132 may include any computing device capable of hosting a Wi-Fi network, thereby allowing other wireless devices to connect to a wired network using Wi-Fi. For example, access points 130-132 may include a wireless router, a wireless access point, a wireless repeater, a wireless base station, or a computing device that is capable of hosting an ad-hoc Wi-Fi network.

Venues 140-146 may refer to the geographic location of a structure or a point of interest that provides one or more Wi-Fi networks. For example, venues 140-146 may refer to a storefront, a restaurant, an office, a hotel, a public building, a private residence, a commercial location, or a non-commercial location. In other embodiments, a venue may refer to multiple physical locations, such as the locations of several stores in a department store chain. It should be noted that a venue contains, as part of its infrastructure to provide Internet connectivity to its guests, at least one beacon transmitter and at least one access point.

Cache 220 may be implemented by a system for storing data in volatile or non-volatile storage provided by wireless device 110. For example, cache 220 may be implemented using a multi-dimensional array, a hash table, a hash map, a relational database management system, a text file, or an Extensible Markup Language (XML) file.

Remote server 230 may refer to a stand-alone server, a server cluster located within a facility, or a group of servers distributed across the Internet whose task is to serve content to applications or processes running on remote client devices.

Database 240 may be implemented by a system for storing data in volatile or non-volatile storage. For example, database 240 may be implemented using a multi-dimensional array, a hash table, a hash map, a relational database management system, a text file, or an XML file. Remote server 230 may provide local storage for database 240. Alternatively, database 240 may reside in a separate server located within the same facility or in a different facility.

Network 250 generally refers to the Internet but may also refer to a private local area network (LAN).

Geographic region 260 may refer to a geographic area defined by a circle of a specified radius around a wireless device's location on the Earth's surface. To avoid having to contact a remote server each time a Wi-Fi network is detected, the wireless device may cache data for all Wi-Fi networks located within a geographic region. Geographic region 260 may encompass a substantial portion of a neighborhood, a city, or even an entire state, depending on the density of venues around the wireless device's location and the wireless device's storage capacity.

Note that different embodiments of the present invention may use different configurations, and are not limited to the configuration illustrated in communication environments 100, 200, and 300.

System

Figure 4:
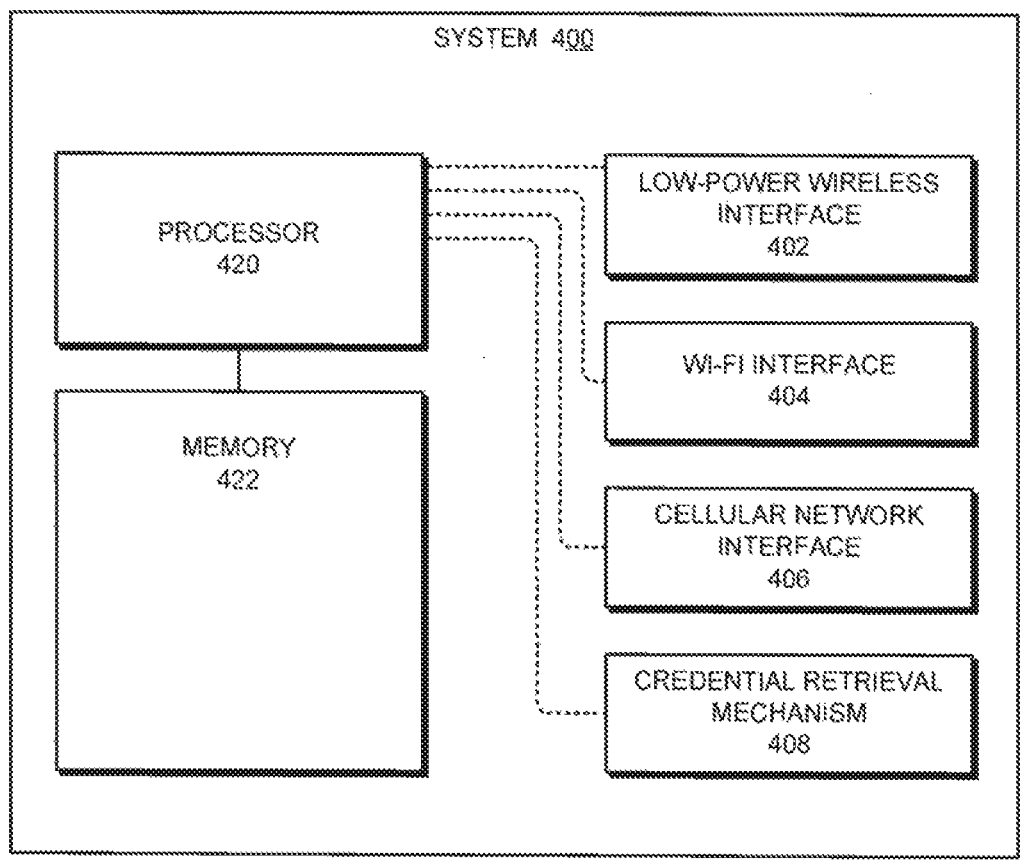
FIG. 4 illustrates a system in accordance with an embodiment of the present disclosure.

FIG. 4 illustrates a system 400 in accordance with the provided apparatus and methods for automatically detecting and connecting to a Wi-Fi network. As illustrated in FIGS. 1-3, system 400 may comprise wireless devices 110-114 or 118, cache 220, or any combination thereof. System 400 can also include low-power wireless interface 402, Wi-Fi interface 404, cellular network interface 406, credential retrieval mechanism 408, processor 420, and memory 422.

Figure 5:
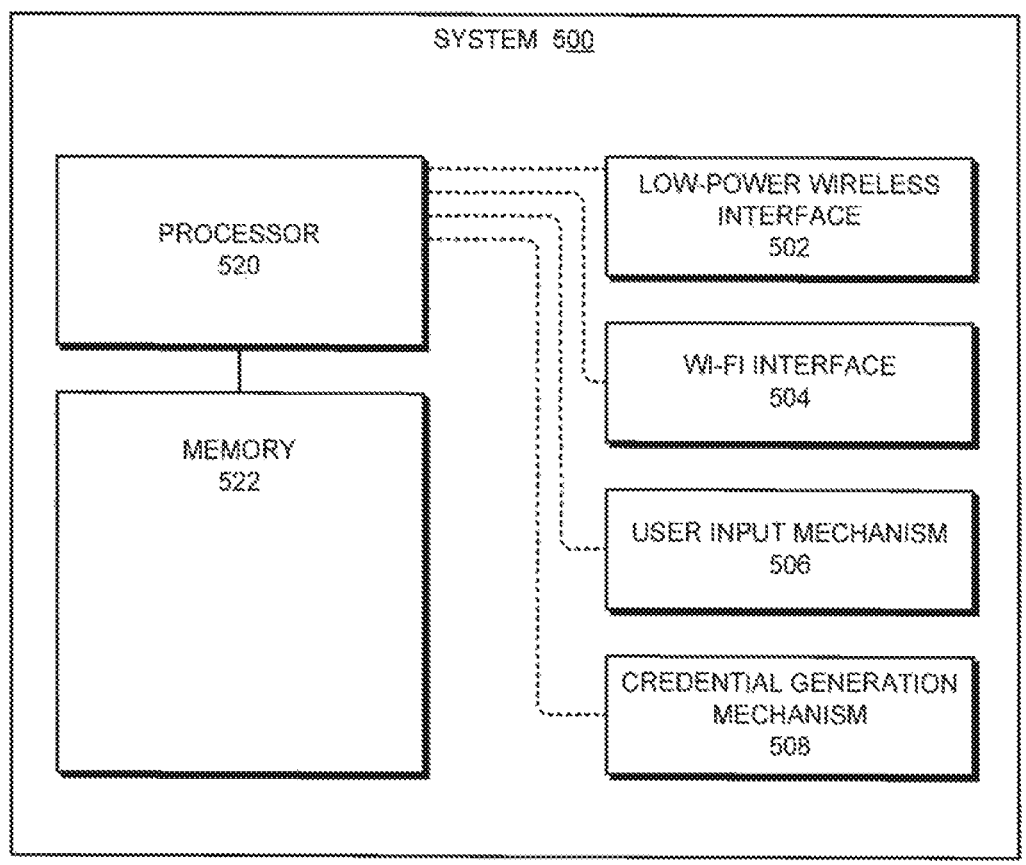
FIG. 5 illustrates a system in accordance with an embodiment of the present disclosure.

FIG. 5 illustrates a system 500 in accordance with the provided apparatus and methods for forming and advertising a Wi-Fi network. As illustrated in FIG. 3, system 500 may comprise wireless device 116. System 500 can also include low-power wireless interface 502, Wi-Fi interface 504, user input mechanism 506, credential generation mechanism 508, processor 520, and memory 522. Operations performed by these mechanisms and interfaces are described in more detail below.

Steps for Automatically Detecting and Connecting to Wi-Fi Networks

Figure 6:
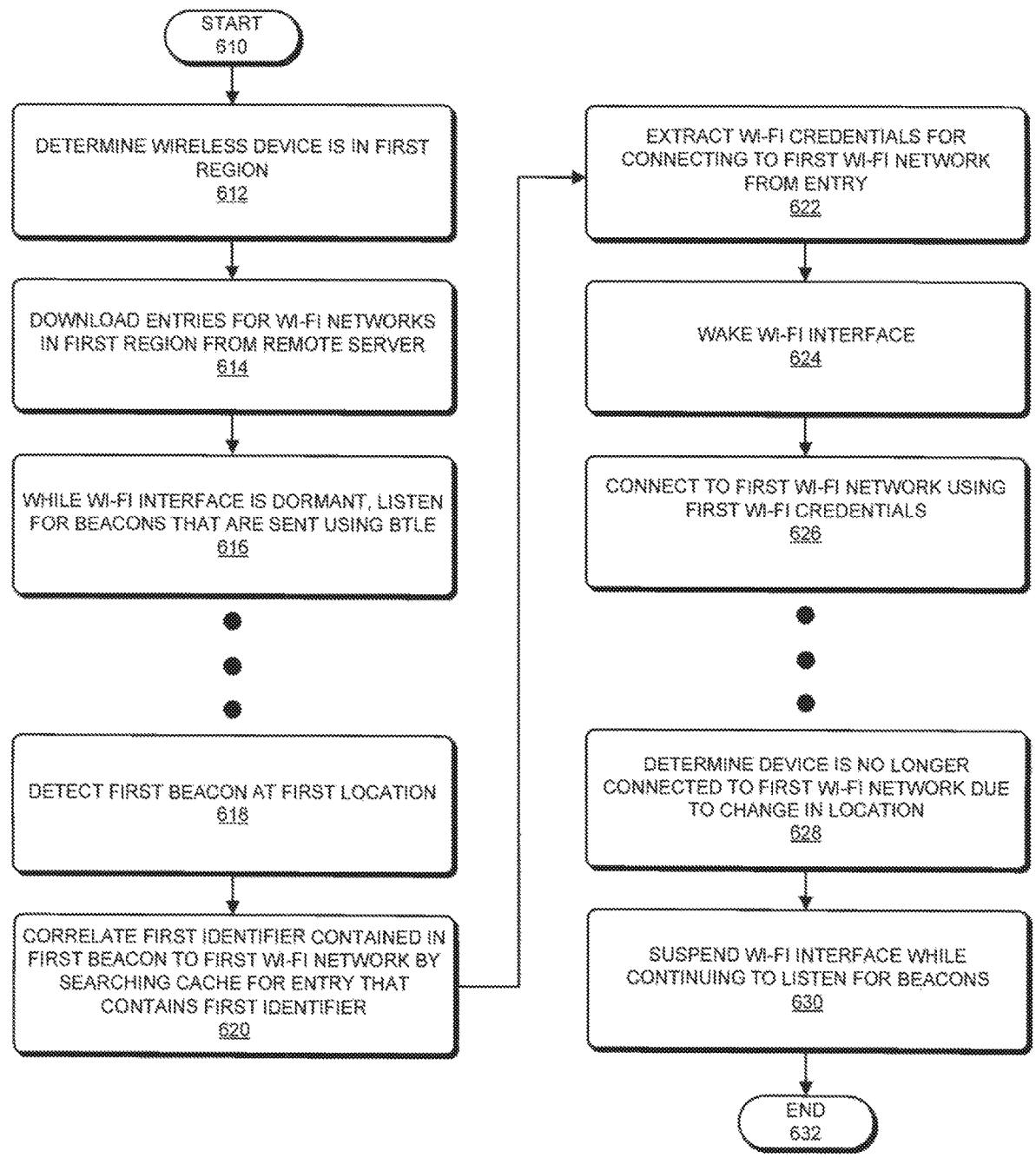
FIG. 6 presents a flowchart illustrating how a wireless device, with the assistance of a remote server and a beacon transmitter, obtains Wi-Fi credentials.
Figure 7:
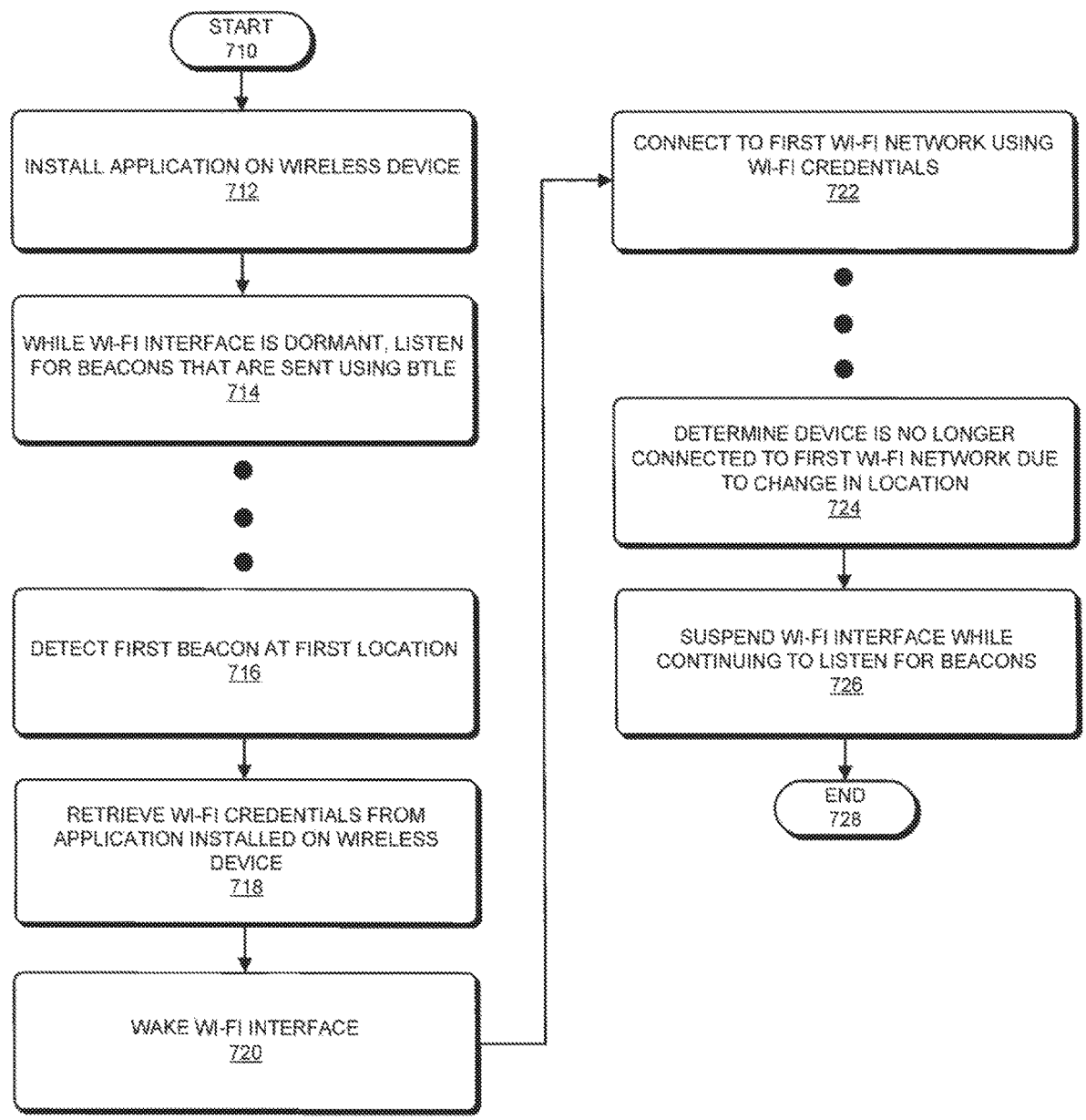
FIG. 7 presents a flow chart illustrating how a wireless device, with the assistance of an application installed on the wireless device and a beacon transmitter, obtains Wi-Fi credentials.
Figure 8:
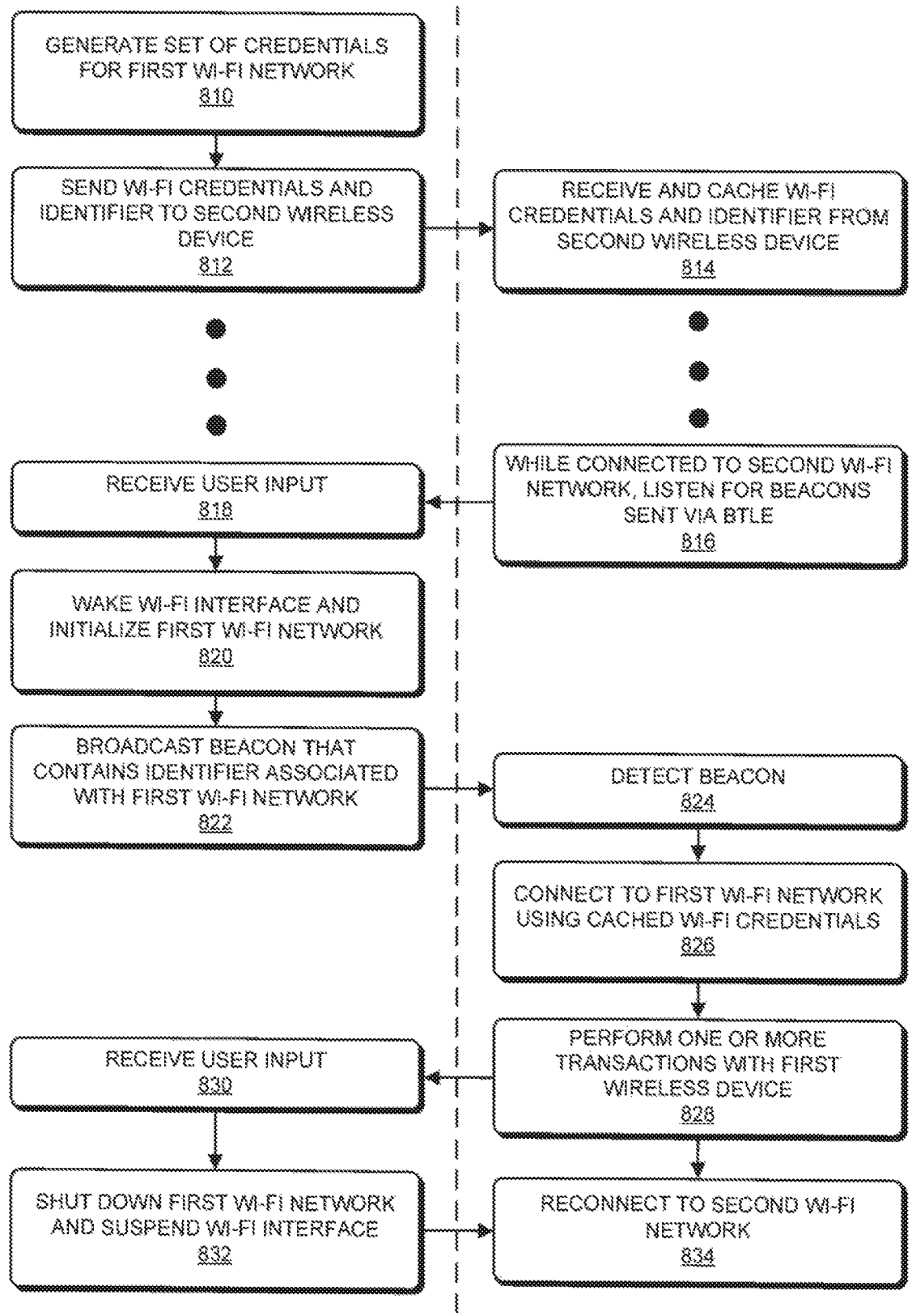
FIG. 8 presents a flow chart illustrating how a second wireless device, with the assistance of a beacon transmission, temporarily connects to a first wireless device to perform one or more transactions.

FIGS. 6-8 illustrate three main variations in how a wireless device uses the detection of a beacon broadcast to provision Wi-Fi credentials for and connect to the Wi-Fi network that the beacon is advertising. The three variations are explored below in sequence.

As illustrated in FIG. 6, the first variation consolidates the Wi-Fi credentials for all venue-provided Wi-Fi networks into a unified database behind a remote server. This technique provides the advantage of allowing the remote server to provide wireless devices with Wi-Fi credentials for all venues within a geographic region.

First, wireless device 110 determines that it is located in geographic region 260 (operation 612). If wireless device 110 has recently traveled a great distance or has not updated cache 220 in a while, cache 220 likely possesses outdated Wi-Fi credentials or Wi-Fi credentials for venues in another geographic region. To update cache 220, wireless device 110 uses cellular network interface 406 to communicate its location across network 250 to remote server 230. In some embodiments, wireless device 110 may transmit its Global Positioning System (GPS) coordinates to remote server 230 via a web service call. Alternatively, the system may be able to ascertain wireless device 110's general location by determining which cell tower wireless device 100 is currently associated with. Next, remote server 230 retrieves data pertaining to venues within geographic region 260 from database 240 and forwards the data to wireless device 110 (operation 614). Wireless device 110 then caches this data.

Figure 9:
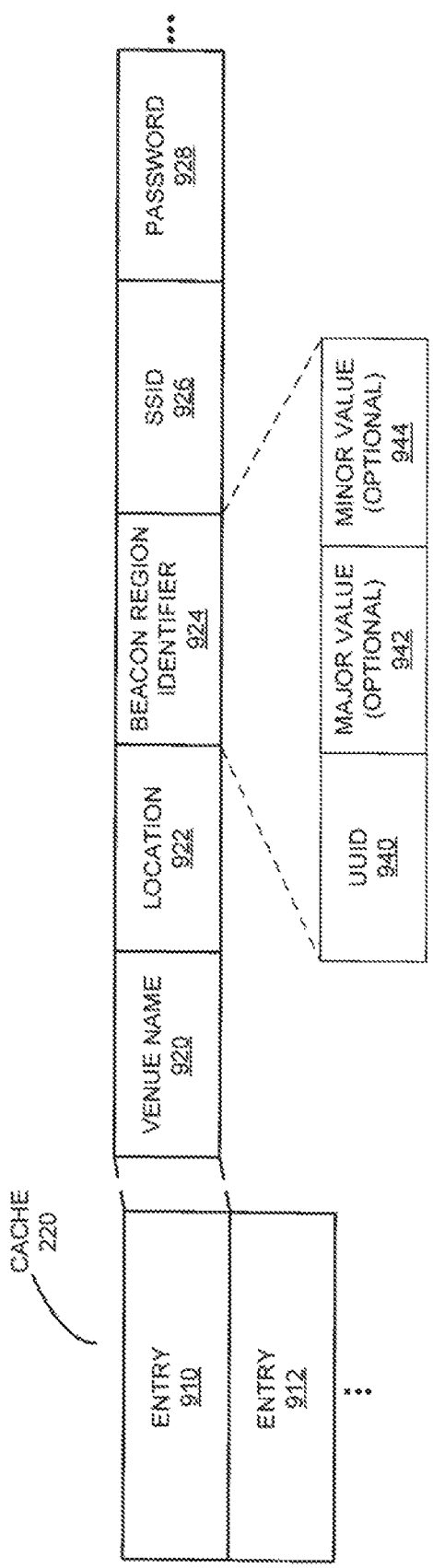
FIG. 9 is a block diagram illustrating a data structure in accordance with an embodiment of the present disclosure.

Before continuing down the flow chart in FIG. 6, this disclosure provides an overview of how the downloaded data is structured. Data pertaining to venues is structured in the form of database entries (also referred to as "tuples"). As illustrated in FIG. 9, cache 220 may contain one or more of these entries (e.g. entries 910-912), wherein each entry may comprise a beacon region identifier (e.g. beacon region identifier 924), a service set identifier (e.g. SSID 926) of a Wi-Fi network, a Wi-Fi password (e.g. password 928), a venue name (e.g. venue name 920), and a geographic location (location 922). Furthermore, a beacon region identifier may comprise a universally unique identifier (e.g. UUID 940), an optional major value (e.g. major value 942), and an optional minor value (e.g. minor value 944). Each entry within cache 220 corresponds to a beacon region identifier on a one-to-one basis, which enables wireless device 110 to efficiently correlate a beacon region identifier with the SSID of a Wi-Fi network assuming that cache 220 contains an entry that matches the beacon region identifier. Additionally, when downloading data from remote server 230, wireless device 110 may receive one or more map tiles that represent geographic region 260, wherein each map tile contains entries that correspond to beacon regions located within the map tile.

It should be noted that while a beacon region identifier corresponds to a single beacon region, a beacon region may contain multiple beacon transmitters. In the simplest case, a first proprietor may set up a single beacon transmitter within her venue to broadcast a beacon region identifier that contains a randomly generated UUID. In doing so, the first proprietor creates a beacon region that spans the beacon transmitter's broadcast range. Here, the single-transmitter beacon region adequately advertised a single-access point Wi-Fi network provided by the first proprietor's venue.

In a more complicated scenario, where a second proprietor's venue provides a larger Wi-Fi network implemented by multiple access points and repeaters, the broadcast range of a single beacon transmitter may be too small to advertise the Wi-Fi network in all areas where the Wi-Fi network is available. Therefore, the second proprietor may position multiple beacon transmitters throughout her venue to create a single beacon region that covers all areas served by the Wi-Fi network. This multi-transmitter beacon region may also be identified by a single beacon region identifier that also contains a randomly generated UUID. Here, all beacon transmitters that make up the beacon region transmit the same beacon region identifier.

Including a major value and/or a minor value in a beacon region identifier may be useful for a venue that wants more granularity when it comes to controlling access to multiple Wi-Fi networks. For example, a venue that spans multiple non-contiguous locations (e.g. a department store chain) may require Wi-Fi networks in each location to use different sets of credentials. Rather than configure beacon transmitters at each Wi-Fi network to broadcast beacon region identifiers with different UUIDs, the venue may set all of its beacon transmitters to broadcast beacon region identifiers that share the same UUID but contain different major values or minor values.

Finally, it should be noted that while entries correspond to beacon region identifiers on a one-to-one basis, multiple entries may share the same venue. For example, a large venue (such as a department store chain) with multiple locations may require an entry for each Wi-Fi network provided at each location. Here, the entries that correspond to the large venue may all correspond to beacon region identifiers that share the same UUID but have different major values and/or minor values.

Returning to the flow chart in FIG. 6, wireless device 110 has updated cache 220 with entries for all beacon regions within geographic region 260. At this point, wireless device 110 can retrieve Wi-Fi credentials for any Wi-Fi network that corresponds to a beacon region within geographic region 260 directly from its cache. If, sometime in the future, wireless device 110 travels into another geographic region, wireless device 110 will need to contact remote server 230 to update its cache again.

Assuming that wireless device 110 stays within geographic region 260 for the time being, wireless device 110 suspends Wi-Fi interface 404 and cellular network interface 406 while maintaining low-power wireless interface 402 in an active state to listen for beacon transmissions (operation 616) while wireless device 110 travels about the region. In some embodiments, wireless device 110 may itself enter into a suspended state in a bid to conserve battery power while leaving low-power wireless interface 402 active.

After a period of time, wireless device 110 travels to venue 140 and enters within the broadcast range of beacon transmitter 120. As shown in FIG. 1, the network infrastructure of venue 140, which is designed to provide Internet connectivity to its guests, comprises access point 130 and beacon transmitter 120. Beacon transmitter 120 periodically broadcasts a beacon that wireless devices can detect if within broadcast range (e.g. wireless devices 110 and 112, but not wireless device 114) using a low-power wireless interface. Meanwhile, access point 130 provides a Wi-Fi network that wireless devices within its signal range (e.g. wireless devices 110 and 112, but not wireless device 114) may connect to using a Wi-Fi interface.

Here, low-power wireless interface 402 detects a beacon broadcast from beacon transmitter 120 (operation 618). In response to this detection, wireless device 110 wakes itself up from a suspended state. Then, wireless device 110 extracts a beacon region identifier contained within the beacon broadcast and forwards it to credential retrieval mechanism 408. Credential retrieval mechanism 408 then correlates the beacon region identifier with its corresponding Wi-Fi network by querying cache 220 for an entry that contains a matching beacon region identifier (operation 620). If a matching entry is found, credential retrieval mechanism 408 extracts Wi-Fi credentials in the form of an SSID/password pair from the entry (operation 622). Next, wireless device 110 wakes up Wi-Fi interface 404 (operation 624) and uses the Wi-Fi credentials to connect to the Wi-Fi network provided by access point 130 (operation 626), thereby granting wireless device 110 Internet connectivity.

It should be noted that while the broadcast range of beacon transmitter 120 may more or less match the signal range of access point 130, in some embodiments, the broadcast range of beacon transmitter 120 may slightly exceed the signal range of access point 130, which allows low-power wireless interface 402 to detect beacon transmissions earlier and give wireless device 110 and Wi-Fi interface 404 more time to wake up before wireless device 110 travels within range of access point 130. This provides the added benefit of ensuring that wireless device 110 is ready to connect to the Wi-Fi network immediately once it enters access point 130's range.

While wireless device 110 remains within range of access point 130, wireless device 110 continues to enjoy the benefit of its Wi-Fi connection. Eventually, however, wireless device 110 may travel away from venue 140 and out of range of access point 130. Here, Wi-Fi interface 404 may determine that wireless device 110 is no longer connected to access point 130 due to a change in location (operation 628). In response to this determination, wireless device 110 may again place Wi-Fi interface 404 in a dormant state while maintaining low-power wireless interface 402 in an active state to continue listening for beacon broadcasts (operation 630). If wireless device 110 eventually travels to another venue, low-power wireless interface 402 may detect a beacon broadcast from the second venue's beacon transmitter. In response to this detection, wireless device 110 may repeat operations 620-626 to connect to the Wi-Fi network provided by the venue's access point.

FIG. 7 illustrates a second variation where a third-party application, which is installed on the wireless device, provisions Wi-Fi credentials to the wireless device. Rather than having the wireless device rely on an internal cache that updates itself from a remote server, the second variation delegates the task of obtaining Wi-Fi credentials to a third-party application. This variation may be useful in cases where a venue wants complete control over their Wi-Fi credentials.

Prior to interacting with any Wi-Fi networks provided by the venue, a third-party application is installed onto wireless device 110 (operation 712). In some embodiments, the device's user installs the third-party application. Alternatively, the device's vendor may install the third-party application prior to selling the device. Take, for example, a department store chain that provides a Wi-Fi network at each of its locations. The department store chain, in a bid to lure more customers, forms an agreement with a smartphone vendor to install the chain's third-party application into all wireless devices of a particular model. Next, a user purchases one of these devices, wireless device 110, from the vendor. It should be noted that the third-party application does not have to run constantly, and may instead instruct the device's operating system (OS) to run or wake up the application when the OS detects any beacon region identifier before shutting itself down. In some embodiments, the third-party application may instruct the OS to wake up the application only when it detects a beacon region identifier within a specific set of beacon region identifiers, Some time later, while traveling in geographic region 260, wireless device 110 listens for beacon transmissions (operation 714) while its Wi-Fi interface is suspended. Suppose that the department store chain operated venue 140. After a period of time, wireless device 110 travels to venue 140 and enters within the broadcast range of beacon transmitter 120. As in the first variation, low-power wireless interface 402 detects a beacon broadcast from beacon transmitter 120 (operation 716).

Unlike the first variation, however, credential retrieval mechanism 408 interacts with the third-party application rather than an internal cache to obtain the Wi-Fi credentials needed to connect to the Wi-Fi network venue 140 (operation 718). Here, credential retrieval mechanism 408 wakes up the third-party application and passes the extracted beacon region identifier to the application. In some embodiments, the third-party application may return an SSID/password pair that is hardcoded into the application. Alternatively, the third-party application may have wireless device 110 use its cellular network interface to contact a venue-affiliated server to obtain the Wi-Fi credentials. Regardless, the steps taken by the third-party application to translate the beacon region identifier into Wi-Fi credentials are left up to the provider of the third-party application and are generally outside the scope of this application. Once wireless device 110 receives the Wi-Fi credentials from the third-party application, wireless device 110 wakes up Wi-Fi interface 404 (operation 720) and uses the Wi-Fi credentials to connect to the Wi-Fi network (operation 722).

As in the first variation, while wireless device 110 remains within range of access point 130, wireless device 110 continues to enjoy the benefit of its Wi-Fi connection. Eventually, however, wireless device 110 may travel away from venue 140 and out of range of access point 130. Here, Wi-Fi interface 404 may determine that wireless device 110 is no longer connected to access point 130 due to a change in location (operation 724). In response to this determination, wireless device 110 may again place Wi-Fi interface 404 in a dormant state while maintaining low-power wireless interface 402 in an active state to continue listening for beacon broadcasts (operation 726).

FIG. 8 illustrates a third variation where first wireless device 116 may communicate credentials to second wireless device 118, thereby enabling second wireless device 118 to automatically detect and connect to a Wi-Fi network provided by first wireless device 116 at some point in the future. This variation is useful in situations where two wireless devices want to transfer data via a temporary Wi-Fi network. For example, suppose a user needs to transfer pictures from a digital camera to her laptop. Since the digital camera is Wi-Fi capable, the user is able to configure the digital camera to create a temporary Wi-Fi network, have the laptop connect to it, and transfer the pictures over the temporary Wi-Fi network. However, doing so involves a number of tedious steps. For instance, after configuring the camera to set up the temporary Wi-Fi network, the user would have to disconnect the laptop from any Wi-Fi network that it is currently connected to, connect the laptop to the temporary Wi-Fi network, and enter the temporary Wi-Fi network's password. After copying the pictures over, the user would then need to manually disconnect the laptop from the temporary Wi-Fi network, reconnect the laptop to the Wi-Fi network it was previously connected to, and shut down the digital camera's Wi-Fi network. The flow chart in FIG. 8 illustrates how some embodiments may automate or eliminate a portion of these steps.

During a pairing process between the first and second wireless devices, the user may perform several configuration steps. Here, first wireless device 116, illustrated by system 500 in FIG. 5, may be a digital camera while second wireless device 118, illustrated by system 400 in FIG. 4, may be a laptop. It should be noted that first wireless device 116 uses Wi-Fi interface 504 to create its temporary Wi-Fi network and low-power wireless interface 502 to implement a beacon region that advertises the temporary Wi-Fi network. Beacons broadcast by low-power wireless interface 502 may contain a beacon region identifier that was supplied by the user, hardcoded into the device, or randomly generated by the device.

First, first wireless device 116 generates an SSID and a password for the temporary Wi-Fi network that it will provide in the future (operation 810). This step may involve credential generation mechanism 508 randomly generating a password using first wireless device 116's serial number or some other randomization secret. Alternatively, first wireless device 116 may prompt the user to supply a password.

Next, first wireless device 116 sends the Wi-Fi credentials and its beacon region identifier to second wireless device 118 (operation 812). To accomplish this step, first wireless device may set up an insecure Wi-Fi network for second wireless device 118 to join and pass the Wi-Fi credentials over in the clear. Alternatively, first wireless device 116 may prompt the user to set up a wired connection between the two devices, such as a universal serial bus (USB) connection, so that first wireless device 116 can transfer the Wi-Fi credentials to second wireless device 118 securely. As another alternative, first wireless device 116 may instruct the user to type the SSID and password into second wireless device 118. Regardless of what method is used, second wireless device 118 receives and caches an entry containing the SSID, the password, and the beacon region identifier (operation 814). After this step, the pairing process is finished.

Suppose that, after a period of time, the user wishes to transfer the photos from first wireless device 116 to second wireless device 118. First, the user places wireless devices 116 and 118 in close physical proximity to each other. Initially, while listening for beacon broadcasts via low-power wireless interface 402, second wireless device 118 may be connected to access point 132, which provides the user's home Wi-Fi network (operation 816). At the same time, first wireless device 116 is neither hosting a Wi-Fi network nor broadcasting beacons.

Then, first wireless device 116 receives an input from the user (operation 818). For example, the user may press a button on first wireless device 116. Alternatively, the user may provide a series of inputs via first wireless device 116's user interface. In response to receiving the input, first wireless device 116 wakes Wi-Fi interface 504 and initializes a temporary Wi-Fi network (operation 820). Next, first wireless device 116 begins periodically broadcasting beacons to advertise the temporary Wi-Fi network (operation 822). Second wireless device 118, being in close proximity to first wireless device 116, detects one of the beacon broadcasts (operation 824). In response to this detection, second wireless device 118 extracts the beacon region identifier from the beacon and searches its cache for a matching entry. If a matching entry is found, second wireless device 118 extracts the Wi-Fi credentials from the entry, disconnects from the Wi-Fi network provided by access point 132, and connects to the temporary Wi-Fi network using the credentials (operation 826).

Once both wireless devices are connected to the temporary Wi-Fi network, the user transfers the photos from first wireless device 116 to second wireless device 118 over the temporary Wi-Fi network (operation 828). When the user is finished, she provides a second input to first wireless device 116, such as pressing the button a second time (operation 830). In response to this second input, first wireless device 116 shuts down the temporary Wi-Fi network, suspends Wi-Fi interface 504, and stops periodically broadcasting beacons (operation 832). Finally, once second wireless device 118 determines that it is no longer connected to the temporary Wi-Fi network, the device may reconnect to the Wi-Fi network provided by access point 132.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A wireless device, comprising:
   a low-power wireless interface;
   a Wi-Fi interface; and
   at least one processor communicatively coupled to the low-power wireless interface and the Wi-Fi interface, the at least one processor configured to execute instructions stored on a memory, causing the at least one processor to:
      host a network using the Wi-Fi interface; and
      broadcast, using the low-power wireless interface, a beacon to advertise the network, wherein the beacon comprises an identifier to enable a second device to determine a location of the wireless device and to connect to the network.

2. The wireless device of claim 1, wherein the instructions further cause the at least one processor to:
   wake the Wi-Fi interface; and
   initialize the network.

3. The wireless device of claim 1, wherein broadcasting the beacon comprises periodically broadcasting beacons to advertise the network, wherein the beacons comprise the identifier.

4. The wireless device of claim 1, wherein the wireless device comprises an access point.

5. The wireless device of claim 1, wherein the identifier enables the second device to determine an identifier of the network and a password associated with the network.

6. The wireless device of claim 1, wherein the instructions further cause the at least one processor to:
   generate one or more credentials before broadcasting the beacon, wherein the one or more credentials comprise a service set identifier and a password associated with the network; and
   transmit the one or more credentials and the password associated with the network to the second device before broadcasting the beacon.

7. The wireless device of claim 1, wherein the low-power wireless interface implements a low-power protocol comprising Bluetooth, Bluetooth Low Energy, or Zigbee.

8. The wireless device of claim 1, wherein the instructions further cause the at least one processor to:
   terminate the network;
   suspend the Wi-Fi interface; and
   terminate broadcasting one or more future beacons.

9. A computer-implemented method, comprising:
   providing a network using a Wi-Fi interface of a device;
   providing low-power wireless communications using a low-power wireless interface of the device;
   broadcasting, using the low-power wireless interface, a beacon to advertise the network provided by the Wi-Fi interface of the device, wherein the beacon comprises an identifier to enable a wireless client device to determine a location of the device and to connect to the network; and
   communicating, using the Wi-Fi interface of the device, with the wireless client device.

10. The computer-implemented method of claim 9, wherein providing the network comprises waking the Wi-Fi interface and initializing the network using the Wi-Fi interface.

11. The computer-implemented method of claim 9, further comprising:
   generating one or more credentials for the network prior to broadcasting the beacon.

12. The computer-implemented method of claim 11, wherein the one or more credentials comprise a service set identifier and a password associated with the network.

13. The computer-implemented method of claim 12, further comprising:
   transmitting the one or more credentials and the identifier to the wireless client device before broadcasting the beacon.

14. The computer-implemented method of claim 9, wherein broadcasting the beacon comprises broadcasting the beacon using a low-power wireless protocol comprising Bluetooth, Bluetooth Low Energy, or Zigbee.

15. The computer-implemented method of claim 9, further comprising:
   terminating the network;
   suspending the Wi-Fi interface; and
   terminating broadcasting one or more future beacons.

16. The computer-implemented method of claim 9, wherein broadcasting the beacon comprises periodically broadcasting beacons to advertise the network, wherein the beacons comprise the identifier.

17. A non-transitory computer-readable medium of a device storing instructions that, when executed by a computer, cause the computer to perform operations comprising:
- initializing a network using a Wi-Fi interface of the device; and
- periodically broadcasting, using a low-power wireless interface of the device, beacons to advertise the network provided by the Wi-Fi interface of the device, wherein the beacons comprise an identifier to enable other wireless devices to determine a location of the device and to connect to the network.

18. The non-transitory computer-readable medium of claim 17, wherein the instructions stored thereon further cause the computer to perform operations comprising:
- generating one or more credentials associated with the network, wherein the one or more credentials comprise a service set identifier and a password associated with the network; and
- transmitting the one or more credentials and the identifier to the other wireless devices before periodically broadcasting the beacons.

19. The non-transitory computer-readable medium of claim 17, wherein the instructions stored thereon further cause the computer to perform operations comprising:
- waking the Wi-Fi interface and initializing the network before periodically broadcasting the beacons;
- after periodically broadcasting the beacons, terminating the network;
- suspending the Wi-Fi interface; and
- terminating broadcasting one or more future beacons.

20. The non-transitory computer-readable medium of claim 17, wherein the instructions stored thereon further cause the computer to perform operations comprising:
- transferring data, using the Wi-Fi interface of the device, to at least one of the other wireless devices.

* * * * *